United States Patent [19]

Bricot et al.

[11] 4,171,879
[45] Oct. 23, 1979

[54] OPTICAL DISC READER HAVING DIFFRACTION MINIMA AT NON-INTERROGATED TRACKS

[75] Inventors: Claude Bricot; Jean-Claude Lehureau, both of Paris, France

[73] Assignee: Thomson-CSF, Paris, France

[21] Appl. No.: 817,010

[22] Filed: Jul. 19, 1977

[30] Foreign Application Priority Data

Jul. 23, 1976 [FR] France ................. 76 22622

[51] Int. Cl.² .................. G02B 27/38; G11B 7/18
[52] U.S. Cl. .................. 350/162 R; 179/100.3 G; 358/128
[58] Field of Search ........... 350/162 R; 358/128, 358/129, 130, 132; 179/100.3 G, 100.3 V

[56] References Cited

U.S. PATENT DOCUMENTS

| | | | |
|---|---|---|---|
| 3,971,002 | 7/1976 | Bricot et al. | 179/100.3 G |
| 3,983,317 | 9/1976 | Glorioso | 358/129 |
| 4,065,786 | 12/1977 | Stewart | 179/100.3 G |

FOREIGN PATENT DOCUMENTS

2235448  1/1975  France .

Primary Examiner—Ronald J. Stern
Attorney, Agent, or Firm—Cushman, Darby & Cushman

[57] ABSTRACT

The invention relates to a method and a device for the optical reading of information recorded on a support along a track in the form of diffracting elements. A diffraction pattern comprising a luminous central spot centered on the section of the track to be read and alternately dark and bright adjacent fringes is projected onto the support, the dark fringes adjacent to the central spot coinciding with the track sections in the neighborhood of the track section to be read. To that effect a pupil limited by two edges which are parallel to the direction of travel of the track is utilized, this pupil being placed against the reading objective.

4 Claims, 4 Drawing Figures

OPTICAL DISC READER HAVING DIFFRACTION MINIMA AT NON-INTERROGATED TRACKS

The invention relates to the optical reading of information which has been previously recorded on a support along a track in the form of a succession of diffracting elements having a substantially constant width and whose length and spacing are non-uniform and are the translation along the track of a rectangular waveform enclosing the information to be read.

According to a known embodiment, the support is in the form of a disc on the surface of which there has been formed the impression of a spiral track. Along this track the diffracting elements are characterized by hollows or projections having a substantially constant width, of the order of a semi-micron. In order to read such a track, it is known to project onto the track a luminous spot by means of a circular microscope objective.

With conventional objectives having numerical apertures of the order of 0.45, reading of a track having a pitch less than 1.6 μm is not possible without introducing an excessive optical noise because, the radiation diffracted by the track sections in the neighbourhood of the track section to be read, which are illuminated at the same time as the track to be read by the sides of the central spot or by the first bright ring of the diffraction pattern, is superimposed on the radiation diffracted by the central section.

An object of the invention is to provide a reading method in which a reading spot is projected on the track to be read, this reading spot being laterally limited by two dark fringes, said two dark fringes being spaced apart a distance which is twice the pitch of the track recorded on the support to be read so that only a very small part of the diffracted radiation comes from the track sections in the neighbourhood of the section to be read.

According to the invention, there is provided optical reading device for reading information support comprising a succession of diffracting elements of constant width and variable length and spacing along a track having a constant pitch, wherein a diffraction pattern comprising a central spot centered on the track section to be read is projected on said support, said central spot being limited in the direction orthogonal to the direction of travel of the track, by two dark fringes, the illumination minima of which coincide with the middles of the track sections adjacent to the track section to be read.

For a better understanding of the invention and to show how the same may be carried into effect, reference will be made to the following description and the attached drawings among which:

Figure 1:
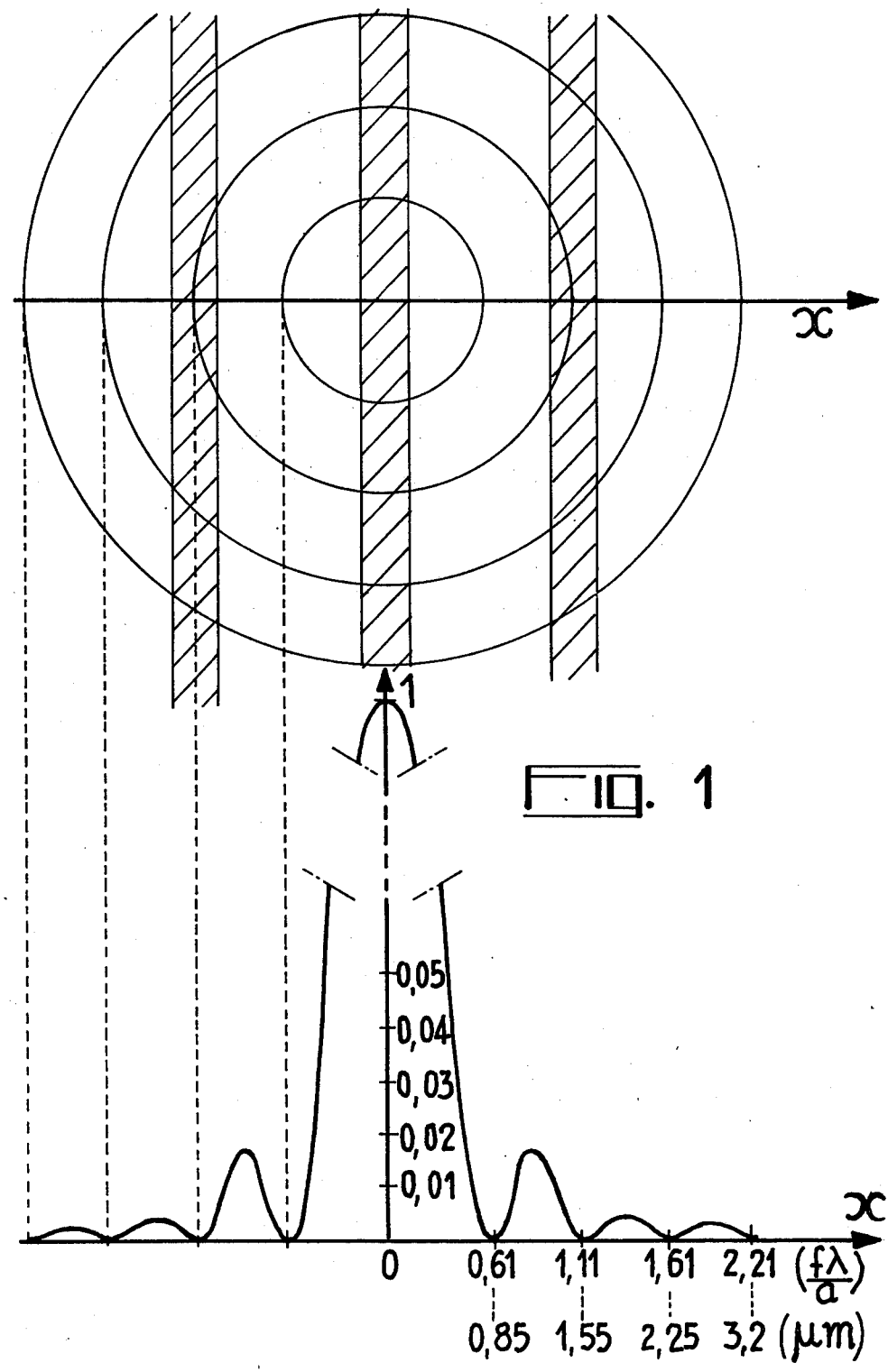
FIG. 1 represents the distribution of the illumination and the intensity function obtained upon diffraction through a circular aperture.

The upper portion of FIG. 1 shows a diffraction pattern of a circular pupil obtained in the vicinity of the focus spot. This pattern comprises a central spot and alternately dark and bright concentric rings. The distribution of intensity as a function of the distance to the center (reckoned as a number of times $f\lambda/a$ wherein a is the radius of the pupil of the objective, f is the focal distance and $\lambda$ the wavelength of the reading) with respect to the maximum intensity of the center of the central spot, is represented in the lower portion of FIG. 1. The maximum illumination in the first bright ring is very distinctly less than the illumination at the center (in the order of 1.75% of the latter).

When it is desired to read an information support by means of a reading spot of this type, the reading objective must be adapted to the track to be read in such manner that the diffractive elements of track sections on each side of the read element do not disturb in an excessive manner, by the radiation they diffract, the radiation diffracted by the read element or, reciprocally, to read with a given objective only supports on which there are engraved tracks having a sufficiently large pitch. If it is assumed, which is usually the case, that the optical noise is rather low when the illumination received by the neighbouring sections is lower than 1% of the illumination received by the read section, the track pitch is determined as a function of the numerical aperture of the reading objective. Thus a reading objective having a numerical aperture equal to 0.45 results, when the reading radiation has a wavelength of 0.63 μm, in a satisfactory reading provided that the pitch of the track is not less than 1.6 μm. That is to say that the track sections in the neighbourhood of the read track section are located outside the first bright ring of the diffraction pattern. Neighbouring track sections are shown in FIG. 1, the pitch of the track being equal to 1.6 μm. Such a positioning causes the exterior sections to receive no more than 1% of the illumination received by the read section, which is satisfactory.

Figure 2:
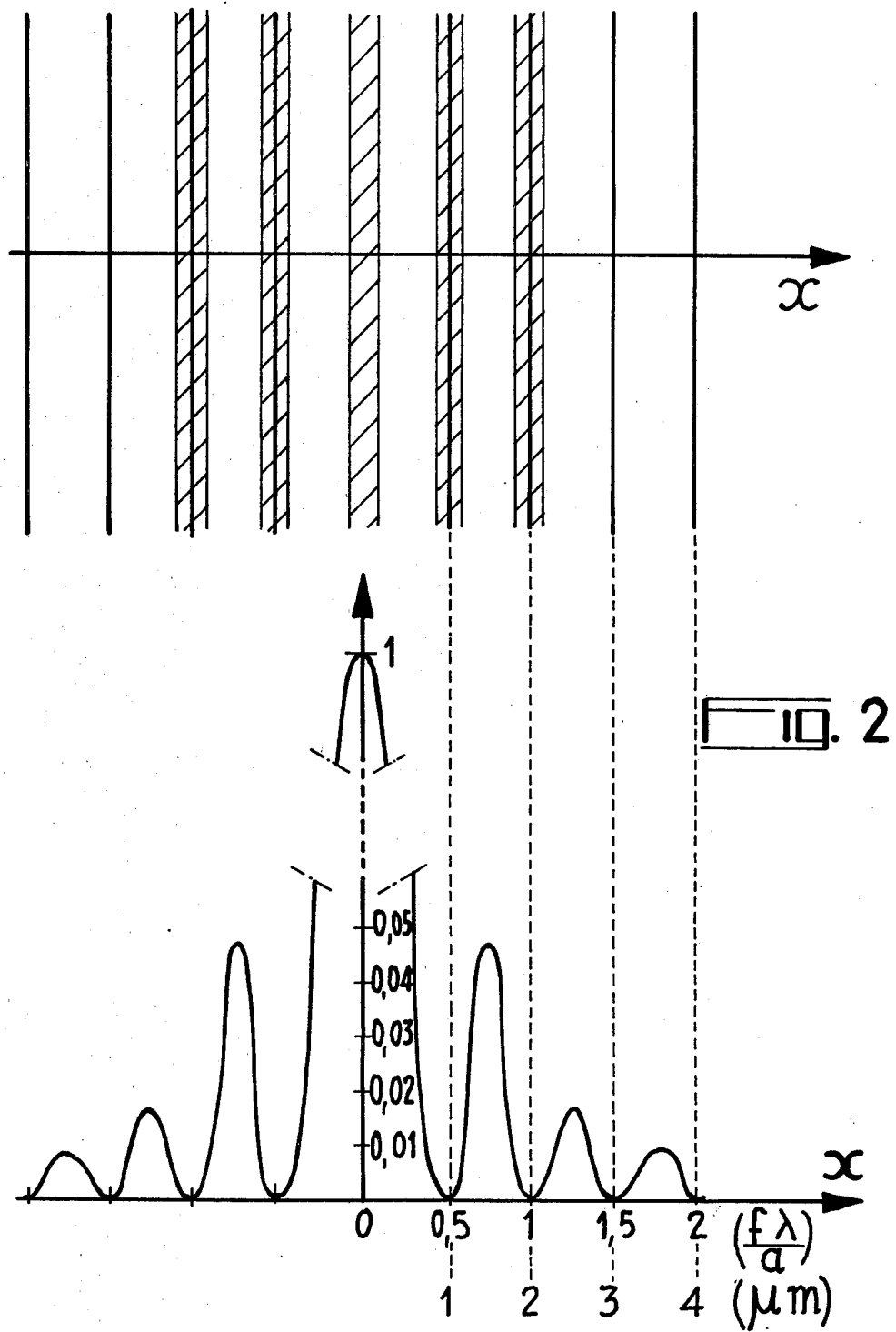
FIG. 2 represents the illumination distribution and of the intensity function obtained upon diffraction through an aperture in the form of a slit.

FIG. 2 is a diagram similar to FIG. 1 but showing the diffraction pattern of a pupil in the form of a slit, the distance x from a point of the network to the center being, as before, reckoned in numbers of times $f\lambda/a$, wherein f is the focal distance of the pupil, a is half the width of the slit and $\lambda$ the reading wavelength. The maximum intensity at the center of the first bright fringe is markedly higher than the intensity at the center of the first bright ring in the case of the circular pupil. However, as the fringes are rectilinear, the whole of the track section in the vicinity of the read section may be placed in minima of illumination, the illumination in the first bright fringe is therefore unlikely to notably disturb, upon diffraction, the radiation diffracted by the element illuminated by the central fringe. The width of the slit must therefore be adapted to the pitch of the track to be read. The even spacing of the fringes causes the following track sections to also coincide with the dark fringes.

If it is considered that this slit is obtained by a partial shutting off of a microscope objective having an aperture 0.45 similar to that employed in the above example, the semi-width a of the slit being equal to $a/\sqrt{2}$, the width of the bright fringe is substantially equal to 2 μm and consequently the pitch of the track may be chosen to be equal to 1 μm so that the middles of the track sections in the neighbourhood of the read section coincides with the first illumination minima. Although the illumination rapidly increases on each side of these minima, such a disposition, when the track has a width of 0.4 μm, does not result in an illumination of the neighbouring sections exceeding 1% of the illumination received by the central section.

Even if the decentering of the disc with respect to the diffraction pattern reaches an amplitude of 0.1 μm, the optical noise remains low.

In practice, the diffraction pattern of a circular objective thus laterally shut off is closely similar to the diffraction pattern obtained by means of a rectangular pupil.

Such a diffraction area is constituted by two superimposed orthogonal fringe networks which produce a kind of crossed pattern. Along the two orthogonal axes of the pupil, the intensity distribution is that shown in lower portions of FIG. 2. Each of the rectangles of the patch has for sides $f\lambda/a''$ $f\lambda/b''$ except those which are along the axes and the central rectangle, one or the other or both sides of which are double, $a''$ and $b''$ being length and width of the pupil.

The reading device according to the invention comprises a projection system for projecting on the support to be read, this support being readable by means of a concentrated radiation (by transmission or by reflection), a diffraction pattern comprising a reading spot limited, in the direction orthogonal to the track to be read in the reading plane, by two dark parallel fringes, the pitch of the track being such that the track sections in the neighbourhood of the track section to be read coincide with these illumination minima.

This optical device for reading an information support comprises a projection objective adapted to concentrate the radiation it receives on the support to be read, this objective being partly shut off so as to form a pupil having a substantially rectangular shape having edges parallel to the direction of travel of the track and a width which is a function of the pitch of the track to be read.

Figure 3:
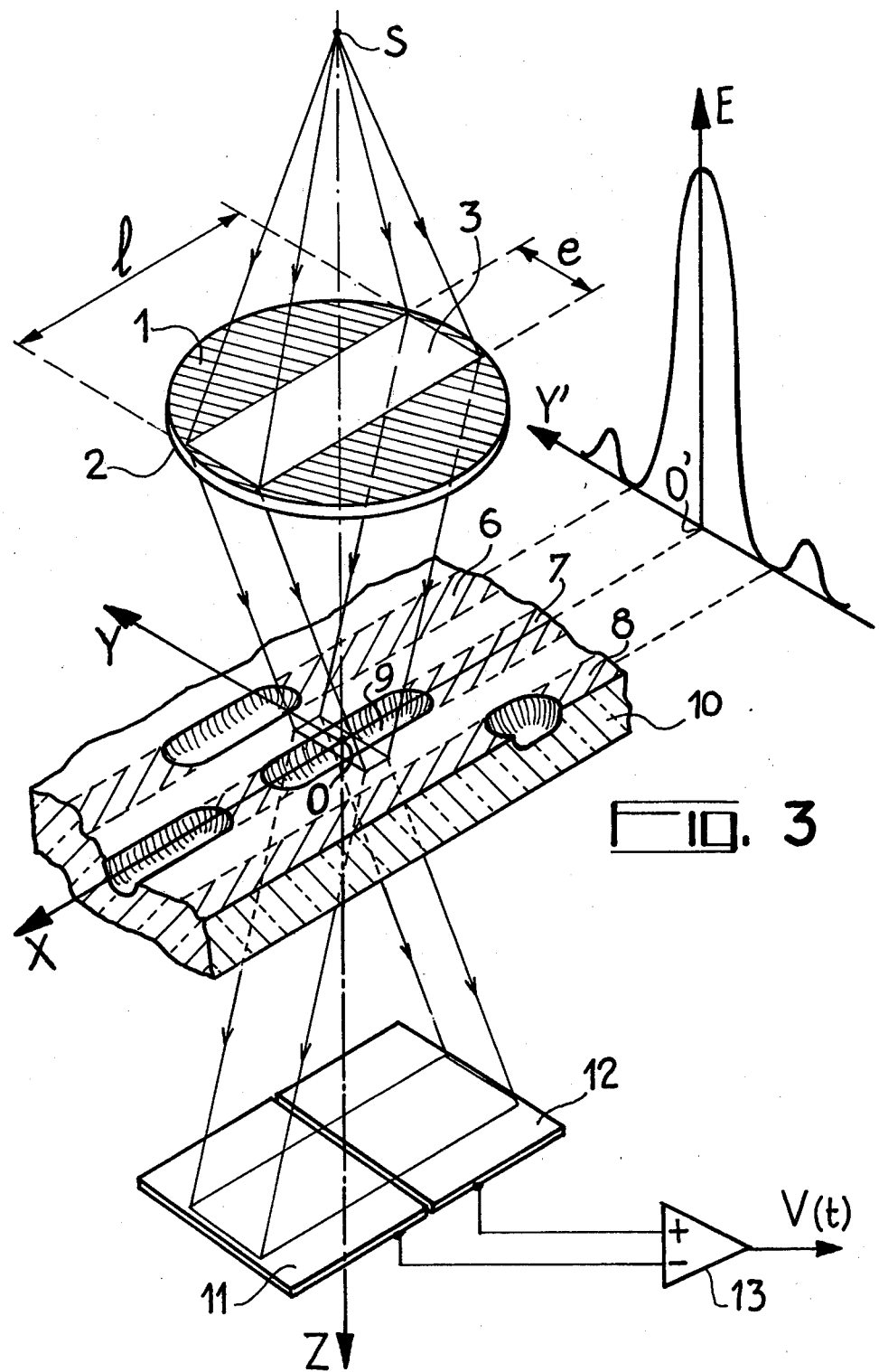
FIG. 3 represents an embodiment of a device for reading the information support according to the invention.

FIG. 3 represents the optical device for reading an information support by means of an objective having a pupil laterally limited by two edges parallel to the track as described hereinbefore.

This optical reading device, only partly represented, comprises a monochromatic radiation source S located on the optical axis OZ of a projection system which comprises an objective 2 forming at O the image of the source S and a stop 1 covering the pupil of the objective. This opaque stop is provided with a rectangular window 3 limiting the radiation beam transmitted toward the support 10. On the drawing only a fraction of the support has been shown. By way of a non-limitative example, it has been supposed that the track containing the information is inscribed in a spiral on the surface of the support 10 which has the shape of a disc. The center of this disc is located in the direction OY which represents the radial direction, the axis OX representing the tangential direction. The track therefore appears on the drawing in the form of equidistant spiral sections 6, 7, 8 (their pitch being, by way of example, equal to 1 μm whereas their width is equal to 0.4 μm). The hollows, such as 9, constitute the diffracting elements (the projecting elements would produce a similar diffracting action on the reading beam).

It is also possible to suppose that the information support to be read is in the form of a tape carrying tracks which are parallel to the tangential direction OX.

As the support is supposed to be readable by transmission, the radiation diffracted by the read track is received by photodetector cells 11 and 12, located in a detection plane parallel to the plane of the support, respectively on each side of a plane defined by the axes OY, OZ.

The output signals of these two cells are applied to the inputs of a differential amplifier 13 whose output signal V(t) is characteristic of the recorded information.

As described above with reference to FIG. 2, the radiation from the pupil 3 is projected onto the support in a diffraction pattern comprising a substantially rectangular central spot surrounded by two substantially orthogonal networks of dark fringes. The width e of the pupil 3 is so chosen that the first dark fringes coincide with the track sections in the neighbourhood of the central section. The distribution of the illumination along the axis OY is represented diagrammatically along O'Y'. The rectangular spot represented around O corresponds to the projection of a truncated cone within which the intensity of the radiation remains higher than a predetermined fraction of the intensity at the center of the diffraction pattern. The length 1 of the pupil determines the length of the reading spot. This length is adapted to the spatial frequency recorded on the support, that is to say, at least equal to the minimum length of the diffracting elements such as 9.

In FIG. 3 only the reading device proper has been shown. It is of course necessary to add thereto devices for radially controlling the reading device with respect to the track to be read, for correcting radial error (correction of the decentering) and for correcting vertical error to form a complete system for reading recorded information supports. Such devices are described in publications related to this field and form no specific part of the invention.

Figure 4:
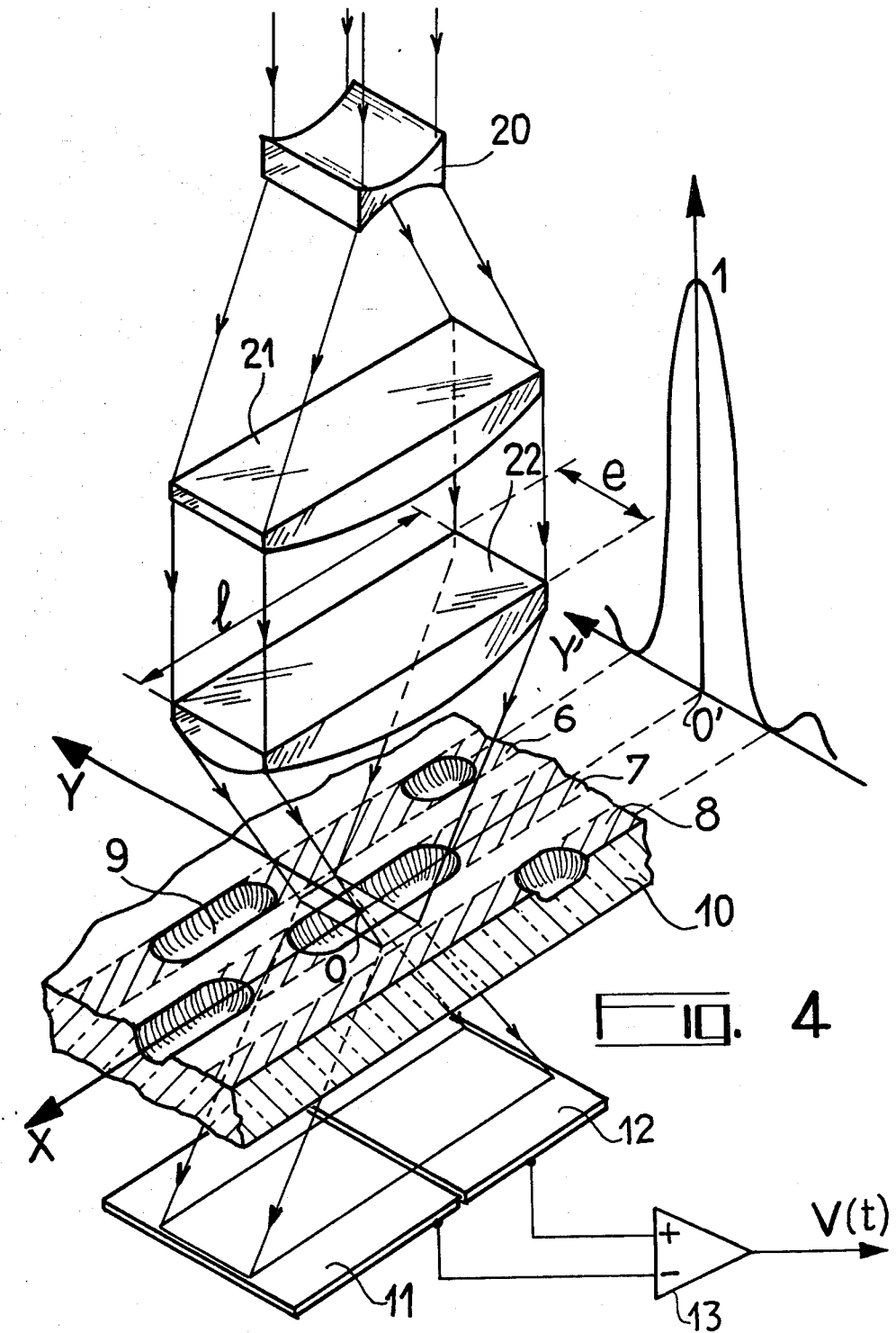
FIG. 4 represents a second embodiment of such a reading device.

FIG. 4 shows another embodiment of a device for reading an information support according to the invention supposed to be, by way of example, also adapted to the reading of supports readable by transmission.

In this figure, the same elements as in FIG. 3 are designated by the same references. The source of radiation (not shown) delivers a parallel beam. The projection objective 22 has a pupil of rectangular section. To adapt the input beam to this pupil, the projection device comprises an anamorphic device comprising, by way of example, a divergent cylindrical lens 20 and a convergent cylindrical lens 21. The projection objective 22 is a spherical lens which projects onto the support a diffraction pattern similar to that previously described, the pupil being rectangular.

As before, the dimensions e and 1 of the pupil are such that the projected diffraction pattern has dark fringes which coincide with the middles of the track sections in the neighbourhood of the section to be read, the central spot having a length adapted to the recorded spatial frequency.

Such devices are adapted to the reading of discs on which the items of information have been recorded along a spiral track having a small pitch (of the order of a micrometer).

The amount of information capable of being stored therefore considerably increases. By way of example, a support disc on which has been formed the impression of a track having a pitch of 1 μm corresponds to a program duration of 48 minutes whereas a similar disc corresponds to only 30 minutes of program when the pitch is equal to 1.6 μm.

It is also possible to record the same amount of information as on discs having a pitch of 1.6 μm on the same area. The benefit will then be in respect of the reduction of the speed of rotation of the disc, which permits the utilization of slower, and therefore cheaper, position control devices.

Another possibility of benefit would be to reduce the engraved area by recording the same quantity of items of information as on conventional support but on a ring of the disc of larger inside radius. There is then a benefit in the larger spatial frequencies which can thus be recorded.

The invention is not limited to what has been previously described and illustrated. In particular, similar reading devices may be employed for reading supports which are readable by reflection.

What we claim is:

1. An optical reading device for reading an engraved information support disc comprising a succession of diffracting elements of constant width and variable length and spacing recorded along a spiral track having a constant pitch, said device comprising a laser source to emit reading radiation, a projecting device for concentrating said reading radiation on a track section to be read, said projecting device forming on said disc a diffraction pattern comprising a central spot, and dark fringes parallel to the tangential direction at said track section to be read, the illumination minima of said dark fringes coinciding, when said central spot is centered on said track section to be read, with the middles of the successive track sections along the radius of said disc going through said track section to be read.

2. An optical reading device for reading an information support disc as claimed in claim 1, wherein said projecting device has an optical axis and comprises means to form a source point, a circular objective masked to form a pupil centered on the optical axis, said pupil having two edges parallel to the tangential direction, said two edges being separated by a predetermined distance, said distance being a function of the pitch of the track, of the wavelength of the radiation, and of the numerical aperture of the objective.

3. An optical reading device for reading an information support disc as claimed in claim 1, wherein the pupil has a rectangular shape, whereby the diffraction pattern comprises two orthogonal networks of fringes surrounding the bright central spot.

4. An optical reading device for reading an information support disc as claimed in claim 1, wherein said projecting device comprises means to form a source point and an objective having a rectangular pupil, whereby said diffraction pattern includes two orthogonal networks of fringes surrounding the central spot.

* * * * *